: US 9,235,570 B2
(45) Date of Patent: Jan. 12, 2016

(12) United States Patent
Park et al.

(10) Patent No.: US 9,235,570 B2
(45) Date of Patent: Jan. 12, 2016

(54) OPTIMIZING INTERNET CAMPAIGNS

(75) Inventors: Lemuel S. Park, Cerritos, CA (US);
Sammy Yu, San Mateo, CA (US);
Jimmy Yu, Foster City, CA (US);
Emeka Ajoku, San Mateo, CA (US);
Thomas J. Ziola, Menlo Park, CA (US)

(73) Assignee: BRIGHTEDGE TECHNOLOGIES, INC., San Mateo, CA (US)

( * ) Notice: Subject to any disclaimer, the term of this patent is extended or adjusted under 35 U.S.C. 154(b) by 697 days.

(21) Appl. No.: 13/477,034

(22) Filed: May 21, 2012

(65) Prior Publication Data

US 2013/0132437 A1 May 23, 2013

Related U.S. Application Data

(63) Continuation-in-part of application No. 13/409,804, filed on Mar. 1, 2012.

(60) Provisional application No. 61/449,064, filed on Mar. 3, 2011.

(51) Int. Cl.
*G06F 17/30* (2006.01)
*G06Q 30/02* (2012.01)

(52) U.S. Cl.
CPC ............ *G06F 17/30* (2013.01); *G06Q 30/02* (2013.01)

(58) Field of Classification Search
CPC .......... G06Q 30/0247; G06Q 30/0256; G06Q 30/0276; G06Q 30/024; G06Q 30/0251
USPC .................................. 707/798, 738
See application file for complete search history.

(56) References Cited

U.S. PATENT DOCUMENTS

| 7,548,929 | B2 | 6/2009 | Collins et al. |
| 8,396,742 | B1* | 3/2013 | Blume et al. ................. 705/14.1 |
| 2003/0149622 | A1* | 8/2003 | Singh et al. .................... 705/14 |
| 2004/0215458 | A1 | 10/2004 | Kobayashi et al. |
| 2007/0055649 | A1 | 3/2007 | Tsuzuki et al. |
| 2008/0071767 | A1* | 3/2008 | Grieselhuber et al. ............ 707/5 |
| 2008/0215607 | A1 | 9/2008 | Kaushansky et al. |
| 2008/0275783 | A1 | 11/2008 | Wee et al. |
| 2009/0006311 | A1 | 1/2009 | Ting et al. |

(Continued)

FOREIGN PATENT DOCUMENTS

| JP | 2010-191963 A | 9/2010 |
| KR | 10-2008-0031058 A | 4/2008 |

(Continued)

OTHER PUBLICATIONS

International Search Report dated Sep. 27, 2012 as received in application No. PCT/US2012/027333.
Written Opinion of the International Searching Authority dated Sep. 27, 2012 as received in application No. PCT/ US2012/027333.

(Continued)

*Primary Examiner* — Mariela Reyes
*Assistant Examiner* — Soheila Davanlou
(74) *Attorney, Agent, or Firm* — Maschoff Brennan

(57) ABSTRACT

In an example embodiment, signals are collected from one or more first channels in a communication network. The one or more first channels may include at least one of organic search, paid search, or social media. Based on the collected signals, a recommendation is made with respect to a campaign within a second channel.

18 Claims, 8 Drawing Sheets

(56) References Cited

U.S. PATENT DOCUMENTS

| | | | |
|---|---|---|---|
| 2009/0292677 A1* | 11/2009 | Kim | 707/3 |
| 2009/0307056 A1 | 12/2009 | Park et al. | |
| 2009/0327028 A1 | 12/2009 | Collins | |
| 2010/0119053 A1 | 5/2010 | Goeldi | |
| 2010/0211455 A1* | 8/2010 | Williams et al. | 705/14.42 |
| 2011/0173056 A1* | 7/2011 | D'Alessio et al. | 705/14.16 |
| 2012/0059708 A1* | 3/2012 | Galas et al. | 705/14.43 |

FOREIGN PATENT DOCUMENTS

| | | |
|---|---|---|
| TW | 200903369 A | 1/2009 |
| TW | 201001202 A | 1/2010 |
| WO | 2007/002859 A2 | 1/2007 |

OTHER PUBLICATIONS

Rubel et al., "Search Engine Visibility", Edelman Digital, May 2009, pp. 2-13.
International Search Report dated Sep. 28, 2012 as received in application No. PCT/US2012/027327.
Written Opinion of the International Searching Authority dated Sep. 28, 2012 as received in application No. PCT/ US2012/027327.
Taiwan Office Action dated May 27, 2014 as received in Application No. 101106657. (English translation).
Taiwan Office Action dated Jan. 22, 2014 as received in Application No. 101106657. (English translation).
TW Office Action dated Mar. 16, 2015 as received in Application No. 101106657 (English Translation).

* cited by examiner

All Keywords _710_

| Latest Reporting Period | Avg. CPC | Avg. Paid Pos. | Total Paid Spend | Paid Conv. Value | Avg. Pos. | Organic Conv. Value | Total Value |
|---|---|---|---|---|---|---|---|
| Aug 7, 2011 to Aug 13, 2011 | $7.14 | 2.2 | $35.61 | $179.00 | 20 | $102.00 | $281.00 |

Keywords Details _720_

Week: Aug 7, 2011 to Aug 13, 2011 ▼　　　　　　　　　　　Show: All Keywords ▼

| Keyword | Avg. CPC | Avg. Paid Pos. | Total Paid Spend | Paid Conv. Value | Avg. Pos. | Organic Conv. Value | Total Value |
|---|---|---|---|---|---|---|---|
| Shoes<br>www.wsite.com/shoes | $6.00 | 2.1 | $5.60 | $10.00 | 2 | $9.00 | $19.00 |
| Cheap Shoes<br>www.wsite.com/shoes/sale | $1.20 | 3.2 | $12.60 | $5.00 | 3 | $12.00 | $17.00 |

Keyword Groups
- All Keywords
  - [All Groups]
- Brand Keywords
- Category - Type 1
- Critical Keywords
- Tier 1 Keywords

_730_

Recommendations _740_

Lower PPC For Keyword "High Heels" by $0.20
Lower PPC For Keyword "Kicks" by $0.18

*Fig. 7*

OPTIMIZING INTERNET CAMPAIGNS

CROSS-REFERENCE TO RELATED APPLICATIONS

The patent application is a continuation-in-part of U.S. patent application Ser. No. 13/409,804, filed Mar. 1, 2012, which claims priority to U.S. Provisional Patent Application No. 61/449,064, filed Mar. 3, 2011, which is incorporated herein by reference.

BACKGROUND

1. Field of the Invention

Embodiments disclosed herein generally relate to the optimization of internet-based campaigns.

2. Related Technology

Companies and individuals may desire to improve the volume and/or quality of traffic to a given webpage or other Internet site to increase sales, brand recognition, dissemination of their product, advertising, or for any other purpose. These companies and individuals may perform campaigns in an attempt to improve the volume and/or quality of traffic. The campaigns may be performed over a number of channels.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY OF SOME EXAMPLE EMBODIMENTS

Some embodiments described herein relate to optimization of one or more campaigns associated with one or more second channels using signals collected from one or more first channels.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, signals are collected from one or more first channels in a communication network. The one or more first channels include at least one of organic search, paid search, or social media. Based on the collected signals, a recommendation is made with respect to a campaign within a second channel.

In another example embodiment, signals are collected from two or more first channels in a communication network. The two or more first channels include at least one of organic search, paid search, or social media. Details of the collected signals from a first channel and a second channel of the two or more first channels are displayed.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 7 illustrates another example of a screenshot of a graphical interface in accordance with some embodiments;

DETAILED DESCRIPTION OF SOME EXAMPLE EMBODIMENTS

Embodiments disclosed herein generally relate to the optimization of one or more campaigns associated with one or more second channels using signals collected from one or more first channels. The campaigns may include, for instance, paid search campaigns, organic search campaigns, or the like. The first channels may include, for instance, paid search, organic search, organic social, paid social, mobile, video, in game networks, local, email, display, or the like or any combination thereof.

More generally, channels may include particular media within a network that are to be searched. In some embodiments, channels can include organic searches, page searches, linked advertisement networks, banner advertisements, contextual advertisements, e-mail, blogs, social networks, social news, affiliate marketing, mobile advertisements, media advertisements, video advertisements, discussion forums, news sites, rich media, social bookmarks, paid searches and in-game advertisements. In some embodiments, channels may further include third-party data, including third-party analysis of media within the network. Nevertheless, the channels are not limited to those mentioned but can include any relevant areas of the Internet to be searched, whether now existing or created in the future.

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
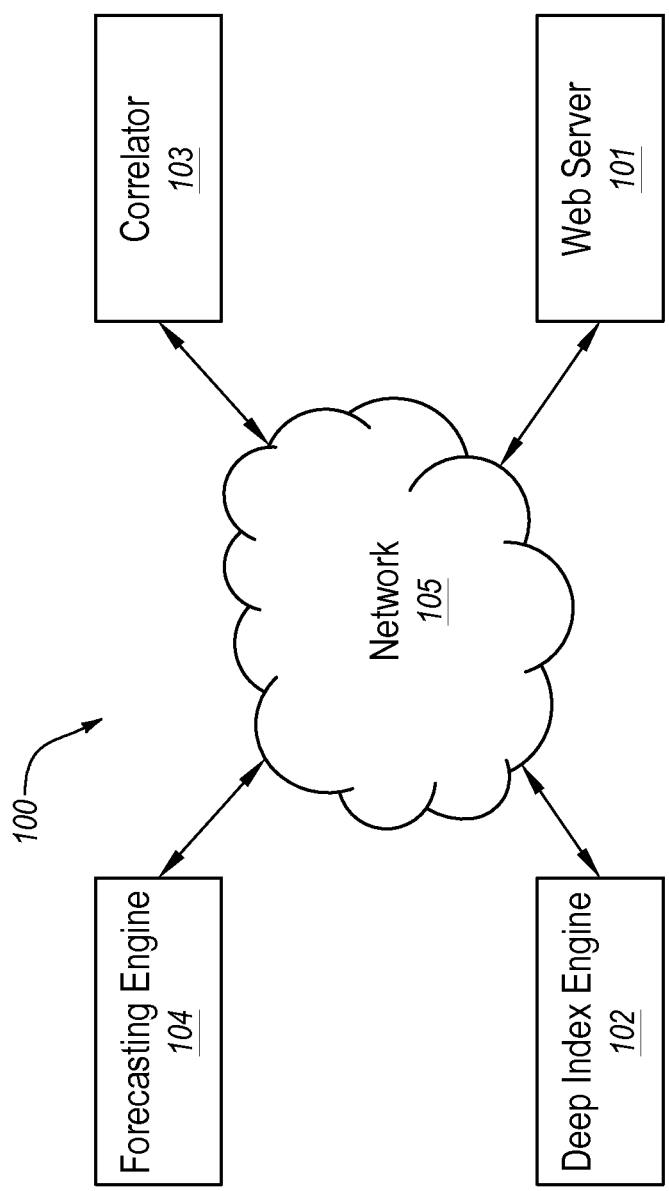
FIG. 1 illustrates an example system in accordance with some embodiments.

Reference is first made to FIG. 1, which illustrates an example system 100 in which some embodiments disclosed herein can be implemented. FIG. 1 shows that the system 100 can include a network 105. In at least one implementation, the network 105 can be used to connect various parts of the system 100 to one another, such as a webserver 101, a deep index engine 102, a correlator 103, and a forecasting engine 104. It will be appreciated that while these components are being shown as separate, the components may be combined as desired. Further, while one of each component is illustrated, it will be appreciated that the system 100 may include any number of each of the components shown or additional components. Furthermore, in some embodiments, the system 100 may include fewer components than those shown.

The forecasting engine 104 may be configured to determine an object or objects to optimize. The objects may include, for example, a search term or terms. Objects, including search terms, may be selected from a group or basket of known search terms that may affect actions related to an entity. Entities can include individuals, corporations, brands, products, models or any other entities referenced anywhere on a network such as the Internet. References to the entity may include links and/or references to one or more Web Pages or other media, such as display advertisements, associated with the entity. Accordingly, the references may include organic references, online advertisements including display advertisements, news items or any other reference to the entity.

The forecasting engine 104 may also be configured to help marketers forecast the business value of optimization initiatives (e.g., if effort is made to optimize a given number of keywords, what is the likely result of improvement in search engine rank position and how much more incremental revenue will be generated from the improvement) and also take into account the difficulty and expense associated with the initiative.

In at least one example, the network 105 includes the Internet, including a global internetwork formed by logical and physical connections between multiple wide area networks and/or local area networks and can optionally include the World Wide Web ("Web"), including a system of interlinked hypertext documents accessed via the Internet. Alternately or additionally, the network 105 includes one or more cellular (radio frequency) RF networks and/or one or more wired and/or wireless networks such as, but not limited to, 802.xx networks, Bluetooth access points, wireless access points, IP-based networks, or the like. The network 105 can also include servers that enable one type of network to interface with another type of network, or any other type of server used in networks.

In at least one implementation, the web server 101 (or "webserver") can include any system capable of storing and transmitting a Web Page to a user. For example, the web server 101 can include a computer program that is responsible for accepting requests from clients (user agents such as web browsers), and serving them HTTP responses along with optional data contents, which can include HTML documents and linked objects for display to the user. Additionally or alternatively, the web server 101 can include the capability of logging some detailed information, about client requests and server responses, to log files.

The entity can include any number of Web Pages. The aggregation of references to the various Web Pages can be referred to as traffic. It should be noted that "Web Page" as used herein refers to any online posting, including domains, subdomains, Web posts, Uniform Resource Identifiers ("URIs"), Uniform Resource Locators ("URLs"), images, videos, or other piece of content and non-permanent postings such as e-mail and chat unless otherwise specified.

In at least one implementation, external references to a Web Page can include any reference to the Web Page which directs a visitor to the Web Page. For example, an external reference can include text documents, such as blogs, news items, customer reviews, e-mails or any other text document which discusses the Web Page. Additionally or alternatively, an external reference can include a Web Page which includes a link to the Web Page. For example, an external reference can include other Web Pages, search engine results pages, advertisements or the like.

In the illustrated example, the deep index engine 102 is configured to use search terms to perform a search of the network to identify references to the entity. The deep index engine 102 is further configured to score results of the search of the network with respect to the entity. This score may include a position at which references to the entity are displayed within the search results. The relative position of the references to the entity within the search result can affect how the references affect actions related to the entity. Accordingly, by determining the relative position of the references within search results, the deep index engine 102 is able to determine a current performance metric for each of the search terms as they relate to the entity.

Additionally or alternatively, the deep index engine 102 may be configured to score the search results for each of the search terms with respect to other entities, including entities found in the competitive listing for the search results. Accordingly, the deep index engine 102 may be configured to gather external data related to performances of other entities.

Additionally or alternatively, the deep index engine 102 may be further configured to crawl the search results related to each of the search terms to retrieve external data. In particular, the deep index engine may be configured to crawl the search results for each of the search terms and analyze data associated with the crawl, including on-page information and back link data (e.g. back link URL, anchor text, etc.) for each URL in the search results. The deep index engine 102 may then analyze the data to identify additional search terms that may be relevant to the entity, but which may not have been searched or on which the entity does not rank. In at least one example, this analysis may include conducting a keyword frequency search. Accordingly, the deep index engine 102 may be configured to surface additional search terms. In at least one example, these additional search terms are opportunities identified and targeted in any channel (search engine optimization (SEO), paid search, social networks, etc.). Cross-channel opportunities are also a part of the opportunity identification (e.g. if a customer is not ranking on a keyword on organic search that a competitor ranks on, the customer can immediately target this keyword in paid search.)

An exemplary deep index engine is described in more detail in copending U.S. patent application Ser. No. 12/436,704 entitled "COLLECTING AND SCORING ONLINE REFERENCES" filed May 6, 2009, the disclosure of which is hereby incorporated by reference in its entirety.

Additional current performance metrics may include internal data determined by the correlator 103. In at least one implementation, the correlator 103 can determine how visitors are directed to the entity and how those visitors behave once there. For example, the correlator 103 can correlate conversion of visits to the search terms that drove the visits.

An exemplary correlator is described in more detail in co-pending U.S. patent application Ser. No. 12/574,069 filed Oct. 6, 2009 and entitled "CORRELATING WEB PAGE VISITS AND CONVERSIONS WITH EXTERNAL REFERENCES" the disclosure of which is hereby incorporated by reference in its entirety.

The forecasting engine 104 may receive data from third parties including information about network activity related to the search terms described above. The forecasting engine 104 may also be configured to receive the internal data, including the output of the correlator 103 as well as external data, including the output of the deep index engine 102. The forecasting engine 104 may use the internal data, the third party data, and the external data to identify opportunities for optimizing placement of references to the entity as well as to forecast the likely costs and benefits of improving references to the entity.

According to some embodiments described herein, signals from a first channel can be used to optimize a campaign associated with a second channel. A campaign may include any effort to improve a benefit an entity derives from a network. For example, campaigns may include, but are not limited to, planning, analyzing, and/or executing pay-per-click (PPC) advertisements on search engines, search engine optimization (SEO) for entity webpages, and the like. In an example embodiment, signals from an organic search channel can be used to adjust the bid price on keywords in a paid search campaign to optimize the return on investment (ROI) for the paid search campaign. Alternately or additionally, signals from a paid search channel can be used to optimize one or more keywords in an organic search campaign. Alternately or additionally, signals from a paid search channel associated with a first search engine may be used to optimize one or more keywords in a paid search channel associated with a second search engine. Alternately or additionally, trending keywords or other trending signals can be identified in paid search, organic search, or social media and can be used to optimize a paid search campaign, an organic search campaign, or a social medial campaign.

The signals may be collected from channels and in some instances may relate to one or more keywords, references to an entity, or references to a competitor of the entity, for instance. The signals may include, but are not limited to, impressions, conversion rates, number of conversions, revenue generated from a paid search campaign, traffic generated from a paid search campaign, best converting ad copy, page rank, click through rate, bid price, page placement of the reference, frequency of the reference on a given web page, location of the reference on the web page, calendar date of a web crawl, calendar date of a web page posting, time of day of the web crawl, time of day of the web page posting, context-drive web indexing, time to download the web page, web browser compatibility of the web page, web plug-in compatibility of the web page or the like. Other examples of signals are described in the Ser. No. 12/436,704 application previously incorporated herein by reference.

Various optimization methods can be applied to the collected signals to, in general, generate one or more recommendations with respect to a campaign in a channel. For instance, in some embodiments, the optimization methods can be applied to the collected signals to optimize a mix of paid and organic search campaigns across corresponding paid and organic search channels. Recommendations may be made with respect to a campaign in any channel, including the same channels from which signals were collected. For instance, in some embodiments, signals may be collected from paid and organic search channels, and recommendations may be made with respect to a paid search campaign and/or an organic search campaign. Optimization may be performed according to any number of criteria. For example, in some embodiments, optimization may focus on obtaining a particular goal (e.g., a favorable average search position) with minimum expense, or on maximizing the impact of a particular budget.

The optimization methods may include, but are not limited to, linear programming, statistical analysis, combinatorial analysis, algorithmic analysis, fuzzy logic, or the like or any combination thereof.

Optionally, signals can be collected from channels associated with various third party sources. Such channels may include social networks (e.g., Facebook, Twitter), paid search platforms, web analytics platforms, local or mobile advertisements, video advertisements, blog and news content and the like. In some embodiments, channels may include competitive intelligence, which may include information associated with the competitors of an entity. For example, if a competitor of an entity appears to be employing a particular strategy with respect to the competitor's paid search or organic search campaigns, that information may be collected as a signal. In some embodiments, signals collected from channels associated with third party sources may include, but are not limited to, Facebook "likes" and equivalents; Twitter and/or blog mentions, links, and/or content; and/or information related to the campaigns of competitors, including information related to paid and/or organic search campaigns of competitors.

Figure 2A:
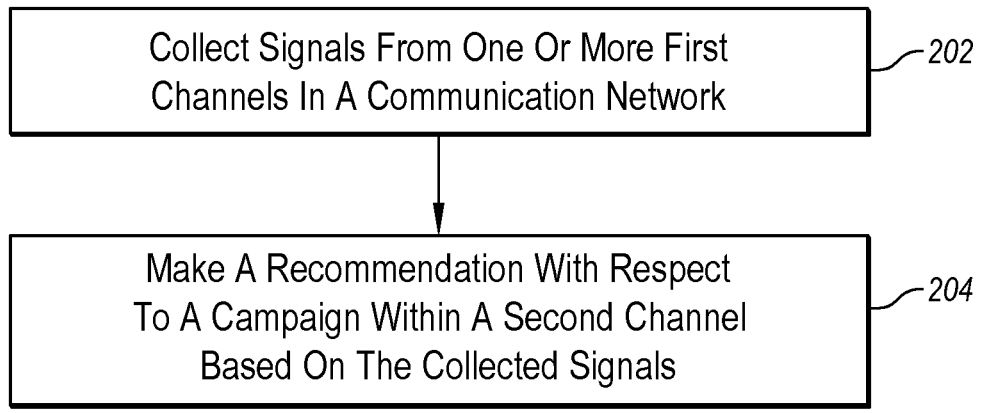
FIGS. 2A-2C are flow charts of example methods in accordance with some embodiments.

FIG. 2A is a flow chart of an example method according to some embodiments disclosed herein. The method of FIG. 2A begins by collecting signals from one or more first channels in a communication network 202. The one or more first channels may include at least one of organic search, paid search, or social media channels. The signals may include the signals discussed with respect to FIG. 1. The signals may be collected by, e.g., the web server 101, deep index engine 102, correlator 103 and/or forecasting engine 104 of FIG. 1, for instance.

The method of FIG. 2A also includes, based on the collected signals, making a recommendation with respect to a campaign within a second channel 204. Various recommendations may be made with respect to campaigns based on collected signals. For example, in some embodiments, recommendations may include, but are not limited to, adding keywords to a campaign, removing keywords from a campaign, changing content on webpages, increasing social media and/or blog "likes," mentions, and/or links directed to a network location, and increasing or decreasing the bid amount for particular keywords in a paid search campaign. In some embodiments, recommendations may be optimized through the application of at least one of linear programming, statistical analysis, combinatorial analysis, algorithmic analysis, or fuzzy logic to the collected signals.

For example, signals of a paid search campaign may be collected. A keyword used in the paid search campaign may be identified as high performing. A recommendation with respect to an organic search campaign may be to include the keyword within the organic search campaign. In some embodiments, the keyword from the paid search campaign may be automatically added to the organic search campaign.

As another example, in some embodiments, a selected keyword used in the organic search campaign may be identified as underperforming. In some embodiments, competitors of an entity for which the organic search campaign is implemented may be performing well for the selected keyword and the organic search campaign may not include the selected keyword. In some embodiments, the selected keyword may be identified as having potential in an organic search campaign based on collected organic search data. In these and other embodiments, a paid search campaign may be implemented using the specific keyword or additional resources may be used for an ongoing paid search campaign for the selected keyword. In this manner, weaknesses in the organic search campaign may be compensated for by the paid search campaign. In some embodiments, this compensation may only be temporary until the organic search campaign begins using the selected keyword or performs better for the selected keyword.

In some embodiments, a campaign may apply to only branded keywords, non-branded keywords or a combination of branded and non-branded keywords.

Figure 3:
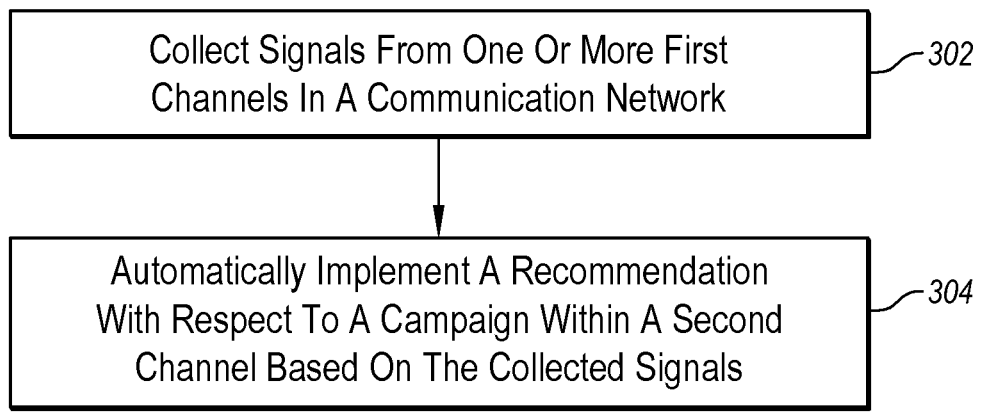
FIG. 3 is a flow chart of an example method that includes automatically implementing a recommendation in accordance with some embodiments.

FIG. 3 is a flow chart of an example method including automatically implementing a recommendation according to some embodiments disclosed herein. The method of FIG. 3 begins by collecting signals from one or more first channels in a communication network 302, which may generally correspond to collecting signals 202 of the method of FIG. 2A. The method of FIG. 3 further includes automatically implementing a recommendation with respect to a campaign within a second channel based on the collected signals 304. Recommendations may be automatically implemented by, e.g., the web server 101, deep index engine 102, correlator 103 and/or forecasting engine 104 of FIG. 1, for instance. Embodiments described herein that include making a recommendation, for example, the method of FIG. 2A, may additionally or alternately include automatically implementing the recommendation.

Referring again to FIG. 2A, according to some example embodiments, the one or more first channels may include paid search and the second channel may include organic search. In some example embodiments, the one or more first channels may include organic search and the second channel may include paid search. Alternately, the one or more first channels may additionally include at least one of social media, social networks, blogs, or display advertisements and the second channel may include organic search. Alternately, the one or more first channels may additionally include at least one of social media, social networks, blogs, or display advertisements and the second channel may include paid search.

The method of FIG. 2A may further include collecting signals from at least one of competitive intelligence, mobile advertisements, or video advertisements, among other signals. In these and other embodiments, the recommendation made with respect to the campaign within the second channel may be further based on the signals collected from the at least one of competitive intelligence, mobile advertisements or video advertisements, among other signals. Alternately or additionally, the method of FIG. 2A may further include collecting signals from historical data, by way of example and not limitation, collected signals may include data concerning signals previously collected. Alternately or additionally, the method of FIG. 2A may further include collecting signals from seasonal data, by way of example and not limitation, collected signals may include information about overall consumer spending trends for different times of the year based on past consumer spending data. Alternately or additionally, the method of FIG. 2A may further include collecting signals from geographical influences, by way of example and not limitation, collected signals may include information about the effectiveness of particular campaign efforts in different geographical locations.

In some embodiments, in which the first channel includes paid search, the signals collected from the first channel may include information concerning conversion rates, generated revenue and/or traffic, related to the text of a clickable advertisement (ad copy) associated with a particular paid search campaign. The second channel may include organic search. In these and other embodiments, making a recommendation with respect to a campaign within a second channel may include automatically recommending modification of content in a web page associated with an organic search campaign based on the best converting ad copy. In these and other embodiments, the method of FIG. 2A may further include automatically updating the content and/or tags of a web page based on the best converting ad copy.

Figure 2B:
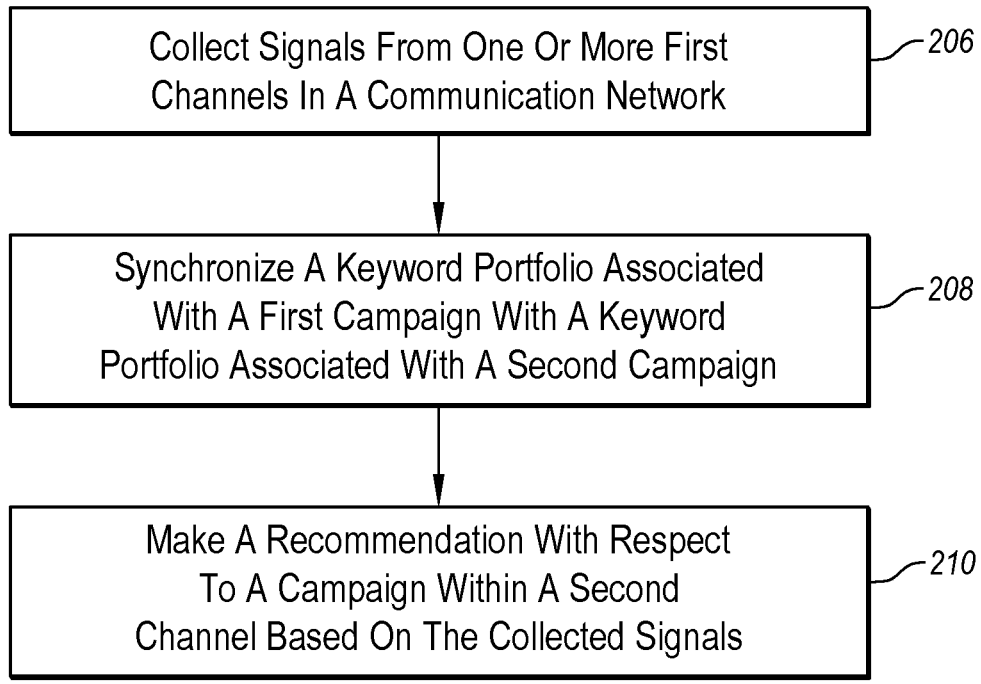

FIG. 2B is a flowchart of the example method that includes synchronizing keyword portfolios according to some embodiments disclosed herein. The method of FIG. 2B begins by collecting signals from one or more first channels in a communication network 206. Collecting signals 206 may generally correspond to collecting signals 202 of the method of FIG. 2A.

The method of FIG. 2B may further include synchronizing a keyword portfolio associated with a first campaign with a keyword portfolio associated with a second campaign 208. In some embodiments, synchronizing a keyword portfolio 208 may include associating data across multiple signals collected from the one or more first channels according to one or more keywords. For instance, in some embodiments, collected signals may relate to average position, impression rates, traffic rates, generated revenue, conversion rates, and other factors of one or more keywords from paid search and organic search. Data from the collected signals may then be associated across campaigns according to keywords. For example, the average paid position of a particular keyword may be associated with the average organic position of the same keyword. Data concerning the particular keyword from other collected signals, such as social media, blogs, web page content, and the like may also be associated with the average paid and organic position of the particular keyword.

The method of FIG. 2B may further include making a recommendation with respect to a campaign within a second channel based on the collected signals 210, which may generally correspond to making recommendations 204 of the method of FIG. 2A. In some embodiments, the method of FIG. 2B may further include automatically implementing a recommendation as described in conjunction with FIG. 3. For example, the method of FIG. 2B may include one or more of: automatically adding, updating, or deleting one or more keywords in the paid search campaign; automatically updating the bid price associated with the one or more keywords in response to the recommendation; or automatically updating ad copy for the one or more keywords in the paid search campaign. In some embodiments, synchronizing keyword portfolios 208 may allow improved recommendations to be made concerning keywords. For example, synchronizing keyword campaigns may allow better analysis and/or optimization of particular keywords by providing a more comprehensive understanding of signals associated keyword across multiple channels. In some embodiments, keyword synching may improve recommendations through considering signals associated with keyword signals over a period of time. For instance, by considering the effect of past changes, new changes may be recommended.

In some embodiments, in which the first channel includes paid search, the signals collected from the first channel may include at least one of impression data, conversion rate data, number of conversions, revenue, bid price, or traffic associated with one or more keywords in a paid search campaign. The second channel may include organic search. In these and other embodiments, making a recommendation with respect to a campaign within a second channel may include automatically recommending at least one of: one or more keywords from the paid search campaign to target in an organic search campaign, one or more semantic variants of the one or more keywords to target in an organic search campaign, and one or more different arrangements of the one or more keywords. For instance, there may be differences in effectiveness between the keyword "best restaurants in new york" versus "new york best restaurants." Thus, a recommendation may include to use the arrangement of keywords of "new york best restaurants" in place of "best restaurants in new york."

In some embodiments, in which the first channel includes organic search, the signals collected from the first channels may include page rank associated with one or more keywords. The second channel may include paid search. In these and other embodiments, making a recommendation with respect to a campaign in a second channel may include recommending an increase or decrease in a bid price associated with the one or more keywords in a paid search campaign.

In some embodiments, the one or more first channels may include both paid search and organic search. An organic search campaign may include an organic keyword portfolio and a paid search campaign may include a paid keyword portfolio. The organic keyword portfolio and the paid keyword portfolio may contain at least some of the same or similar keywords. For instance, each of the organic search campaign and the paid search campaign may include the keyword "shoes" in their respective keyword portfolios. Collected signals associated with paid search channels and organic search channels may include information associated with shared keywords of the organic keyword portfolio and the paid keyword portfolio. For example, signals may include the relative position of a reference to the entity's webpage in a group of paid links presented by a search engine (entity's paid position) and the relative position of a reference to the entity's webpage in a group of search results returned by a search engine (entity's organic position), competitors' paid positions, competitors' organic positions, and the like when the keyword "shoes" is searched in a search engine. The keyword "shoes" may be synchronized between the paid campaign and the organic campaign.

By way of example and not limitation, the entity's current and historical paid position, the entity's current and historical organic position, competitors' current and historical paid positions, competitors' current and historical organic positions, current and historical amounts bid for PPC campaigns, current and historical SEO efforts, and current and historical impression and conversion data for the keyword "shoes" may all be associated. In some embodiments, information related to other campaigns, such as social media campaigns, may be associated with the information of the paid and organic campaigns. In this example embodiment, the synchronized signals may be used to make recommendations to optimize the paid and/or organic campaigns with respect to the keyword "shoes." For example, by considering the synchronized information, it may be possible to recognize that increasing bid amounts for PPC campaigns related to the keyword "shoes" has not led to an overall increase in paid position, organic position or conversions; in this scenario, a recommendation may be made to decrease bid amounts for PPC campaigns.

Alternately or additionally, the method of FIG. 2B may include making recommendations to increase or decrease a paid bid price for one or more keywords in a paid campaign based on organic search data. For example, in some embodiments, a recommendation may include increasing the bid price of a keyword with a low position in an organic search. As further example, a recommendation may include decreasing a bid price of a keyword with a high position in an organic search. This may be done, for example, to optimize exposure for a given amount of money. In some instances, for keywords that rank high on organic search, a high paid rank may not necessarily add much value. By lowering the paid bid price for keywords that rank high on organic search in these instances, the money may be saved, and/or spent where the money may be more effective, for example, to increase the paid bid price of keywords that rank low on organic search. In total, this may have the effect of increasing the effectiveness and/or overall value of a keyword campaign across paid and organic search.

In some embodiments, organic search data may inform a bid price for a paid campaign for one or more keywords. For example, a bid price for a keyword or keywords may be selected based on the organic search data for the keyword or keywords. For example, organic search data for the keywords red shoes may be determined. Based on the organic search data, which may include the rank of the keywords and other signals as discussed herein, a bid price for the keywords red shoes may be determined.

In some embodiments, organic search data for similar and/or the exact keyword or keywords to be used in a paid campaign may not be available. In these and other embodiments, proxy organic data may be used to inform the paid campaign of the keyword or keywords.

For example, in some embodiments, the paid campaign may be based on a keyword cluster. In these and other embodiments, a compilation, using the average, medium, or some other combination of organic signals, of similar keyword variations may be used as a proxy for the keywords in the paid campaign. For example, organic search data for a keyword string, such as, "best pizza in Centerville" may not be available. However, organic search data for 10, 50, 100, 150, 200 more keyword string variations, such as "best pizza in Chicago" may be available. A bidding price in the paid campaign may be based on the compilation of organic search data for the keyword string variations.

As another example, in some embodiments, the paid campaign may be based on broad match keywords. A broad match keyword may be a keyword that describes a category of keywords or keyword strings. For example, a broad match keyword may be shoes and may include keyword or keywords, such as, "Nike©," "stilettos," "Air Jordan's©," among others. When a broad match keyword is purchased in a paid campaign, an advertisement or other article is displayed when a keyword or keywords within the category of the broad keyword are searched. Organic data for the broad keyword may be used to inform a bid price for the keywords within the category of the broad keyword.

As another example, in some embodiments, the paid campaign may be based on a long tail keyword. A long tail keyword may include a head keyword. For example, a long tail keyword, such as, "Nike blue shoes size 12" may have a corresponding head keyword, such as, "Nike shoes." Organic search data for a head keyword may be used to inform the bid price for a long tail keyword that includes the head keyword. This may be referred to as making inferences on head keywords.

Alternately or additionally, the method of FIG. 2B may further include determining whether a conversion rate of the one or more keywords within the paid search is additive to, neutral to, or detracts from a conversion rate of the one or more keywords within the organic search. The method may also determine whether other parameters between campaigns are additive, neutral, or detractive. For example, whether a visit rate is additive, neutral, or detractive. Alternately or additionally, the method may determine whether parameters between other campaigns are additive, neutral, or detractive. For example, the method may determine whether a conversion rate of one or more keywords within a social media campaign is additive to, neutral to, or detracts from a conversion rate of the one or more keywords within the organic search. A user may be informed of the additive, neutral, or detractive relationship of the campaigns. In some embodiments, whether a paid search conversion rate is additive to, neutral to, or detracts from a conversion rate of an organic search may be considered when making recommendations or when automatically implementing recommendations for improving campaigns. For example, recommendations may be made to optimize a return on investment for a given budget by considering what effect a possible investment in one campaign may have on related campaigns.

The conversion rate of the keyword(s) within a campaign may be additive to the conversion rate of the keyword(s) within another campaign, for example, an increase in bid price for a keyword in paid search may cause an increase in the conversion rate of the keyword in organic search. Where parameters of keywords are additive, the keywords may be described as having synergy. If the conversion rate of the keyword(s) in the paid search is additive, the method of FIG. 2B may further include maintaining or increasing the bid price associated with the keyword(s) in the paid search campaign. In some embodiments, either of the two following logical formulae may be independently used to determine whether keywords in paid and organic campaigns are additive:

$\Delta$PaidSpend>0 & $\Delta$PaidConv$\geq$0 & $\Delta$OrganicConv>0 & $\Delta$OrganicRank$\leq$0

$\Delta$PaidSpend<0 & $\Delta$PaidConv$\leq$0 & $\Delta$OrganicConv<0 & $\Delta$OrganicRank$\geq$0

Where $\Delta$PaidSpend may be the change in paid spending for a keyword or keywords, $\Delta$PaidConv may be the change in paid conversions for the keyword or keywords, $\Delta$OrganicConv may be the change in organic conversions for the keyword or keywords and $\Delta$OrganicRank may be the change in average organic rank for the keyword or keywords. A $\Delta$OrganicRank$\geq$0 may indicate that the rank for the keywords or keywords improved or stayed the same. In these and other embodiments, the rank of a keyword or keywords improving indicates that the rank of the keyword or keywords is approaching the highest rank of 1. A $\Delta$OrganicRank$\leq$0 may indicate that the rank for the keywords or keywords has decreased or stayed the same. In these and other embodiments, the rank of a keyword or keywords decreasing indicates that the rank of the keyword or keywords is moving away from the highest rank of 1.

In some embodiments, the above logical formulae may be used in combination to determine whether keywords in paid and organic campaigns are additive. Alternately or additionally, the above logical formulae may include more or less factors than those described above. For example, the additional factors may include historic trends, banner rates, geographic factors, and/or other factors for the keyword or keywords. Alternately or additionally, the additional factors may include universal search results and/or the rank or position of the universal search results for the keywords or keyword.

If either formula described above evaluates as true, the paid campaign may be determined to be additive to the organic campaign for the considered keyword or keywords. For example, if, for a keyword, paid spending decreases, paid conversions decrease or remain unchanged, organic conversions decrease, and the average organic rank decreases or remains unchanged, the paid and organic campaigns for the keyword may be determined to be additive. In some embodiments, the formulae may be altered to another form. For example, if a correlation between a change in average organic rank and a change in organic conversions for a keyword or keywords is known, the formulae may be altered to account for the known correlation.

The conversion rate of the keyword(s) within a campaign may also detract from the conversion rate of the keyword(s) within another campaign, for example, a decrease in bid price for a keyword in paid search may cause an increase in the conversion rate of the keyword in organic search. Put another way, if the conversion rate of a keyword is detractive, an increase in paid spending may reduce conversions through organic search. Where parameters of keywords are detractive, the keywords may be described as cannibalizing. If the conversion rate of the keyword(s) in the paid search is detractive, the method of FIG. 2B may further include decreasing the bid price associated with the keyword(s) in the paid search campaign. In some embodiments, either of the two following logical formulae may be independently used to determine whether keywords in paid and organic campaigns are detractive:

$\Delta$PaidSpend$\leq$0 & $\Delta$PaidConv<0 & $\Delta$.OrganicConv>0 & $\Delta$OrganicRank$\leq$0

$\Delta$PaidSpend$\geq$0 & $\Delta$PaidConv>0 & $\Delta$OrganicConv<0 & $\Delta$OrganicRank$\geq$0

Where $\Delta$PaidSpend may be the change in paid spending for a keyword or keywords, $\Delta$PaidConv may be the change in paid conversions for the keyword or keywords, $\Delta$OrganicConv may be the change in organic conversions for the keyword or keywords and $\Delta$OrganicRank may be the change in average organic rank for the keyword or keywords. If either formula evaluates as true, the paid campaign may be determined to detract from the organic campaign for the considered keyword or keywords. In some embodiments, the formulae may be altered to another form. For example, if a correlation between a change in average organic rank and a change in organic conversions for a keyword or keywords is known, the formulae may be altered to account for the known correlation.

In some embodiments, the method of FIG. 2B may further include recommending a change in bid price associated with keyword(s) in a paid search campaign in order to test whether a conversion rate of the one or more keywords within the paid search is additive to, neutral to, or detracts from a conversion rate of the one or more keywords within the organic search. For example, the method may determine an organic conversion rate for a keyword at a time or period of time "A". The method may then recommend or automatically implement a change in bid price associated with the keyword. After the bid price is changed, the method may determine an organic conversion rate for the keyword at a time or period of time "B". In some embodiments, the method may determine the average organic rank at times "A" and "B" to determine whether the change in average organic rank affected a change in the organic conversion rate between times "A" and "B". Methods of testing that determine a baseline, change a parameter, and then determine the change from the baseline may be described as A/B testing. Other forms of A/B testing may be employed by the method. In some further embodiments, one or more keywords may be categorized by whether a conversion rate of the one or more keywords within the paid search is additive to, neutral to, or detracts from a conversion rate of the one or more keywords within the organic search in response to an increase in the bid price associated with the one or more keywords in the paid search campaign.

In some embodiments, the method of FIG. 2B may include making recommendations based on a predictive model. The predictive model may be based on an additive, neutral, or detractive relationship between two campaigns. For example, if a paid campaign keyword is additive to the organic campaign keyword, a predictive model may account for the additive relationship and predict an increased organic conversion rate when modeling an increase in paid spending for the keyword. Conversely, if a paid campaign keyword detracts from the organic campaign keyword, a predictive model may account for the detractive relationship and predict a decreased organic conversion rate when modeling an increase in paid spending for the keyword.

In some embodiments, the method of FIG. 2B may include recommending and/or automatically implementing a recommendation based on an additive, neutral, or detractive relationship between campaigns. For example, the method of FIG. 2B may include controlling an automated bidding platform. For example, if a paid campaign keyword is additive to the organic campaign keyword, the bid amount may be automatically increased until the relationship becomes neutral or as long as the relationship remains sufficiently additive. Conversely, if a paid campaign keyword detracts from the organic campaign keyword, the bid amount may be automatically decreased until the relationship becomes neutral or additive. In some embodiments, other parameters may be considered. For example, the method may consider a maximum or minimum bid price, a maximum or minimum budget, a bounce rate, and/or recent performance trends in recommending and/or automatically implementing a recommendation.

As indicated above, whether a relationship between two campaigns is additive, neutral, or detractive may depend on a change in conversions for a first of the two campaigns a keyword or keywords and a change in conversions for a second of the two campaigns for the keyword or the keywords. A change in conversions for the campaigns may be a result of a change in user actions, but may also be related to a how a conversion is attributed to a campaign. A conversion may be attributed to a campaign based on a conversion attribution model.

Numerous different conversion attribution models may exist. For example, a last click attribution model may be followed. In these and other embodiments, a conversion is registered for a campaign if the campaign directly results in the conversion. For example, in a paid campaign for selling shoes from a web site following a last click attribution, a conversion for the campaign would be registered if the paid campaign sent a visitor to the website and the visitor purchased shoes from the website directly after being sent to the website. For example, a user may click on a hyperlink in an advertisement of the paid campaign that redirects the user to the website and, without leaving the website, the user purchases shoes from the website.

Another attribution models may be an influences attribution model. In an influence attribution model, a campaign may receive partial or full credit for a conversion by a user on a website, if the campaign influenced the user to make the conversion. Influence may be determined based on the campaign directing the user to the website before the conversion. For example, the user may perform a search using a search engine for shoes and follow a link from the search results resulting from an organic campaign to the website and browse the shoes. In a subsequent visit to the website, the user may purchase the shoes resulting in a conversion. Because the organic campaign influenced the conversion by sending the user to the website before the conversion occurred, the organic campaign may be, at least partially, attributed with a conversion. Numerous other attribution models are contemplated. The above described attribution models are described as examples only and are not limiting.

Changing an attribution model may change the conversions attributed to a campaign. Accordingly, changing the conversion attribution model may change a bidding price for a paid campaign and/or adjusting an amount of resources directed to another type of campaign. Optimizing for various attribution models may result in an optimal amount of resources being directed to a campaign. For example, the conversion attributed to a campaign may be determined based on numerous attribution models, with each attribution model having a corresponding weight. For example, in some embodiments, a last click attribution model may be weighted more than an influence type attribution model because the last click attribution model may more directly lead to a conversion.

The attributed conversions based on the numerous attribution models may indicate that a campaign in a first channel performs better overall then a campaign in a second channel, where as with a single attribution model, such as a the last click attribution model, may indicate the campaign in the second channel performs better than the campaign in the first channel. Alternately or additionally, the attributed conversions based on numerous attribution models may indicate that a campaign in a first channel is similar to a campaign in a second channel where as a single attribution model may indicate a large disparity between the campaigns in the first and second channels.

In some embodiments, the method of FIG. 2B may include predicting outcomes across multiple channels to generate an optimum efficient frontier illustrating possible tradeoffs between channels that may result in the optimization of one or more variables. The predictions may use data collected from the multiple channels. In some embodiments, the data collected may include, historical trend data, A/B testing, other data described herein, or other types of data. Based on the collected data, a recommendation may be generated for the multiple campaigns that may result in the optimization of one or more predetermined variables.

As an example, the multiple channels may include organic search campaign and a paid search campaign. The optimized variable may be traffic for a website and associated costs to generate the traffic. The optimum efficient frontier may indicate the organic rank for keywords and the bid pricing for keywords to obtain a desired amount of traffic to a website for the lowest cost. In some embodiments, the optimization may change over time. For example, for a new keyword, the optimization may include utilizing more of a paid search campaign while the organic search campaign is developed for the keyword. After the organic search campaign begins to show improvement for the keyword, the paid search campaign may be reduced with minimal or no effect on the traffic to the website but with a decrease in cost.

In some embodiments, the method of FIG. 2B may include opportunity and trend identification. For example, the method of FIG. 2B may include determining, based on collected signals, that organic or paid search channels have increased or decreased competition. In these and other embodiments, recommendations may be made with respect to associated campaigns in the converse channel. For example, in response to a change in pay-per-click (PPC) average prices, competition, and/or impression share, recommendations may be made to change organic campaign efforts.

Figure 2C:
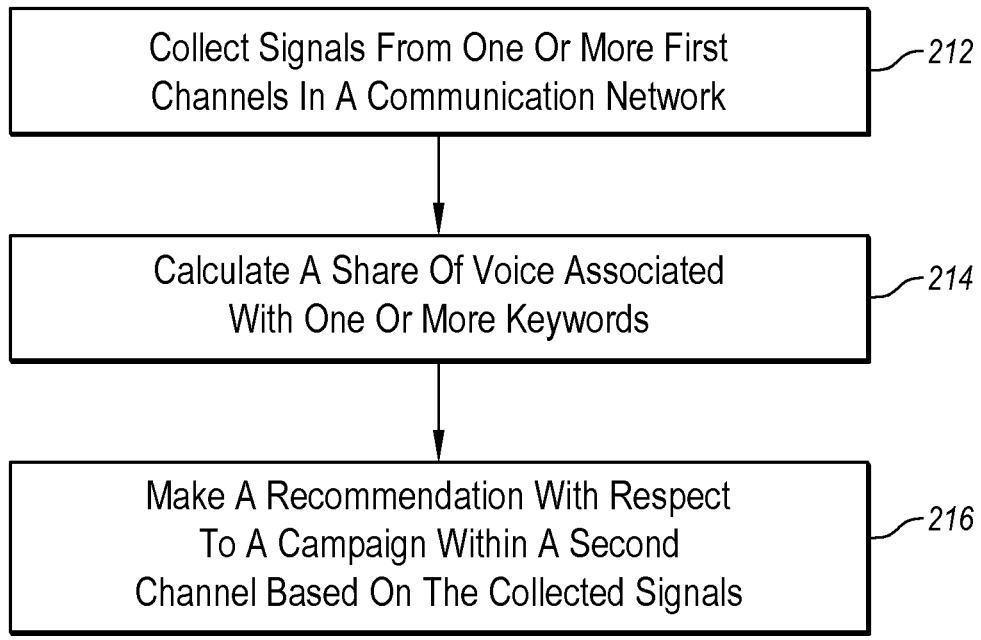

FIG. 2C is a flow chart of the example method of FIG. 2A, further including calculating a share of voice associated with one or more keywords according to some embodiments disclosed herein. The method of FIG. 2C begins by collecting signals from one or more first channels in a communication network 212, which may generally correspond to collecting signals 202 of the method of FIG. 2A and to collecting signals 206 of FIG. 2B.

The method of FIG. 2C further includes calculating a share of voice associated with one or more keywords 214. In some embodiments, calculating a share of voice may further include, based on the collected signals, calculating a share of voice associated with one or more keywords included in an organic search campaign and a paid search campaign. For example, calculating a share of voice may include calculating the rate at which an entity appears on a first page paid search campaign or organic search campaign for one or more keywords over one or more search providers. Alternately or additionally, calculating a share of voice may further include, based on the collected signals, calculating a share of voice of one or more competitors of an entity.

The method of FIG. 2C further includes making a recommendation with respect to a campaign within a second channel based on the collected signals 216, which may generally correspond to making recommendations 204 of the method of FIG. 2A and making recommendations 208 of the method of FIG. 2B. In some embodiments, a calculated share of voice may facilitate identifying recommendations to be made. For example, different recommendations may be made for different distributions of voice. For example, recommendations for a keyword in a crowded field (e.g. if many competitors have a similar share of voice for a particular keyword) may be different than recommendations for a keyword in a field dominated by a few competitors. In some embodiments, recommendations can be made with respect to recommending an increased effort in keywords with a favorable distribution of voice.

The methods of FIGS. 2A-2C and FIG. 3 may, in some embodiments, involve the integration of search data (e.g., organic search data and paid search data) with social data. The integration of search data and social data may facilitate, for example, opportunity and trend identification, opportunities testing and recommendations, and cross channel optimization. Alternately or additionally, recommendations may be made for social media campaigns. For example, a paid social media campaign may be recommended. Social media campaigns may be monitored to determine whether social media campaigns are additive to, neutral to, or detract from other campaigns, including other social media campaigns. For example, it may be determined that a paid social media campaign is additive to an organic social media campaign and/or organic search campaign.

In some embodiments, cross channel optimization may be employed to optimize one or more campaigns across multiple channels. Additionally or alternatively, linear programming may be employed using the forecasted value and costs for each channel to optimize campaigns across the channels, as well as optimize campaigns for in-channel factors, such as additive or detractive effects. Additionally or alternatively, generic algorithms, statistical methods, and/or other mathematical optimization methods may be employed to recommend optimal campaigns. Additionally or alternatively, forecasted value and costs can be derived at least in part from signals collected from the one or more first channels, for example, as discussed with respect to some embodiments described herein.

Alternately or additionally, some embodiments disclosed herein may relate to making social media recommendations. In some embodiments, recommendations may include recommendations to obtain more social media references. For example, recommendations may include increasing the number of Facebook "likes," Twitter "tweets," social media mentions, links, or the like with respect to a webpage of an entity; where applicable, the recommendations may further include recommending one or more keywords to be included in the content of the social media. Although not shown, in some embodiments, information is displayed about social media associated with the websites of an entity and the competitors of an entity.

Making recommendations, for example, as described in the discussion of FIGS. 2A-2C and FIG. 3 may include opportunity testing and recommendations. For example, testing the change in revenue in response to a change in a campaign, and/or testing the additive, neutral, or detractive relation of conversion rates between an organic and paid campaign for one or more keywords.

In some embodiments, forecasts of values and costs of campaign changes are made in order to prioritize tests. For example, campaign changes with the highest forecasted ratio of value to cost may be recommended as priority changes. To forecast the values of the values and costs, one or more of a variety of forecasting algorithms may be used, for example, statistical models, simulations, and/or basic algorithms. In these and other embodiments, actual costs and values may be tracked and used to tune and/or calibrate the forecast algorithms. In some embodiments, regression models may be applied to identify predictor variables for different channels and further improve forecast algorithms.

Figure 4:
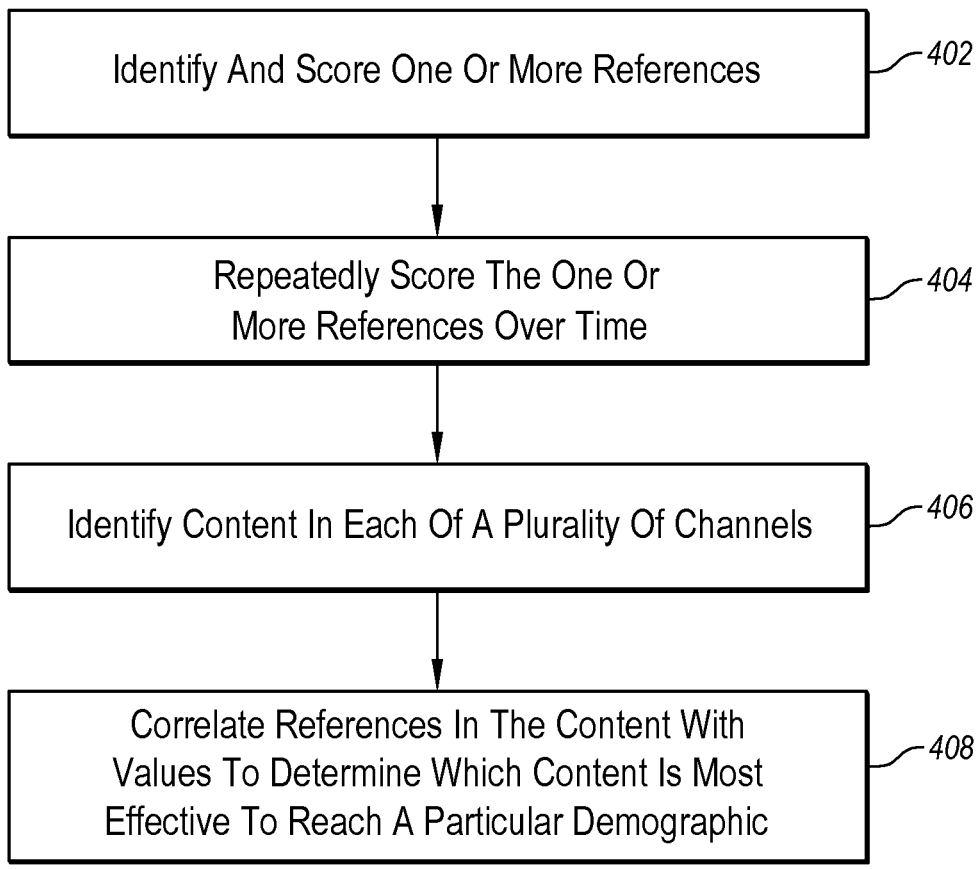
FIG. 4 is a flow chart of another example method in accordance with some embodiments.

FIG. 4 is a flow chart of an example method according to some embodiments disclosed herein. The method of FIG. 4 begins by identifying and scoring one or more references 402. The one or more references may include one or more keywords, URLs (both shortened and full URLs), and general references. In some embodiments, the references include external references to any online posting, including domains, subdomains, web posts, URIs, URLs, images, videos, or other piece of content. The one or more references may be identified and scored by, e.g., the web server 101, deep index engine 102, correlator 103 and/or forecasting engine 104 of FIG. 1, for instance. In some embodiments, references are scored using the frequency, exposure and/or value of the references, or the like. In some embodiments, a reference may be scored according to the frequency at which the reference is repeated, for example, the frequency at which a reference appears in social media, on webpages, or the like. In some embodiments, a reference may be scored according the exposure of the reference, for example, the number and/or diversity of locations the reference, e.g., a reference appearing in multiple types of social media may be scored higher than a reference that appears in only one type of social media. In some embodiments, a reference may be scored by a product of its frequency and exposure. The method of FIG. 4 may further include repeatedly scoring the one or more references over time 404. In some embodiments, scoring the one or more references over time may help identify new opportunities to go across channels.

The method of FIG. 4 may further include identifying content in each of a plurality of channels 406. The content may include, but is not limited to, ad copies, descriptions, tweets, title tags, meta descriptions, text, and the like.

The method of FIG. 4 may further include correlating references in the content with values (e.g., traffic or conversions) to determine what content is most effective to reach a particular demographic 408. The reference may be correlated with values, for example, as disclosed in the Ser. No. 12/574,069 application previously incorporated herein by reference. In some embodiments, the method of FIG. 4 may further include using data from internal sources, third party sources, competitive intelligence sources and external sources for one or more channels.

In an example embodiment, a reference is correlated with traffic, conversions, and/or demographics to determine values. Using content identified in the channels, it may be determined which content is most effective (i.e., in terms of prompting traffic and/or conversions) for reaching a particular demographic. For example, it may be determined that particular ad copy, a particular social media, and/or a particular blog is the most effective for bringing the desired demographic to the web page and promoting a relatively high conversion rate. This may allow efforts to be made to further utilize the content identified as effective at reaching a particular demographic.

Figure 5:
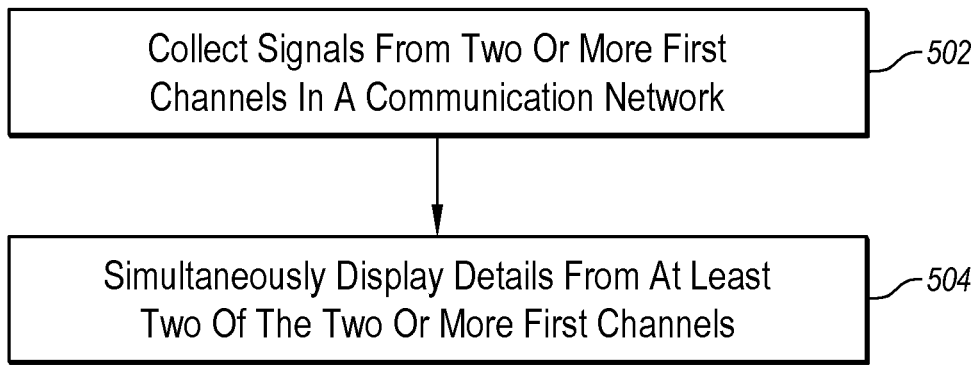
FIG. 5 is a flow chart of an example method that includes displaying details from at least two channels in accordance with some embodiments.

FIG. 5 is a flow chart of an example method according to some embodiments disclosed herein relating to displaying details from at least two channels. The method of FIG. 5 begins by collecting signals from two or more first channels in a communication network 502, which may generally correspond to collecting signals 202 of the method of FIG. 2A, collecting signals 206 of the method of FIG. 2B, and collecting signals 212 of the method of FIG. 2C. In some embodiments, the one or more first channels may include at least one of organic search, paid search, or social media. The signals may be collected by, e.g., the web server 101, deep index engine 102, correlator 103 and/or forecasting engine 104 of FIG. 1, for instance. The method of FIG. 5 further includes simultaneously displaying details from at least two of the two or more first channels 504. The simultaneously displayed details may be displayed on a display device, including, but not limited to a computer monitor, mobile phone display, tablet computer display, or the like. In several embodiments, the simultaneously displayed details may include details over a period of time. In certain embodiments, the simultaneously displayed details may include forecasted details, for example, reflecting predicted results from proposed changes in a campaign. In some embodiments in which the first channels includes paid search and organic search, the signals collected from the first channel may include at least one of impression data, conversion rate data, number of conversions, revenue, bid price, or traffic associated with one or more keywords synchronized between a paid search campaign and an organic search campaign. In this and other embodiments, the simultaneously displayed details may include at least one of impression data, conversion rate data, number of conversions, revenue, bid price, or traffic associated with one or more keywords of the paid and organic search campaigns.

Figure 6:
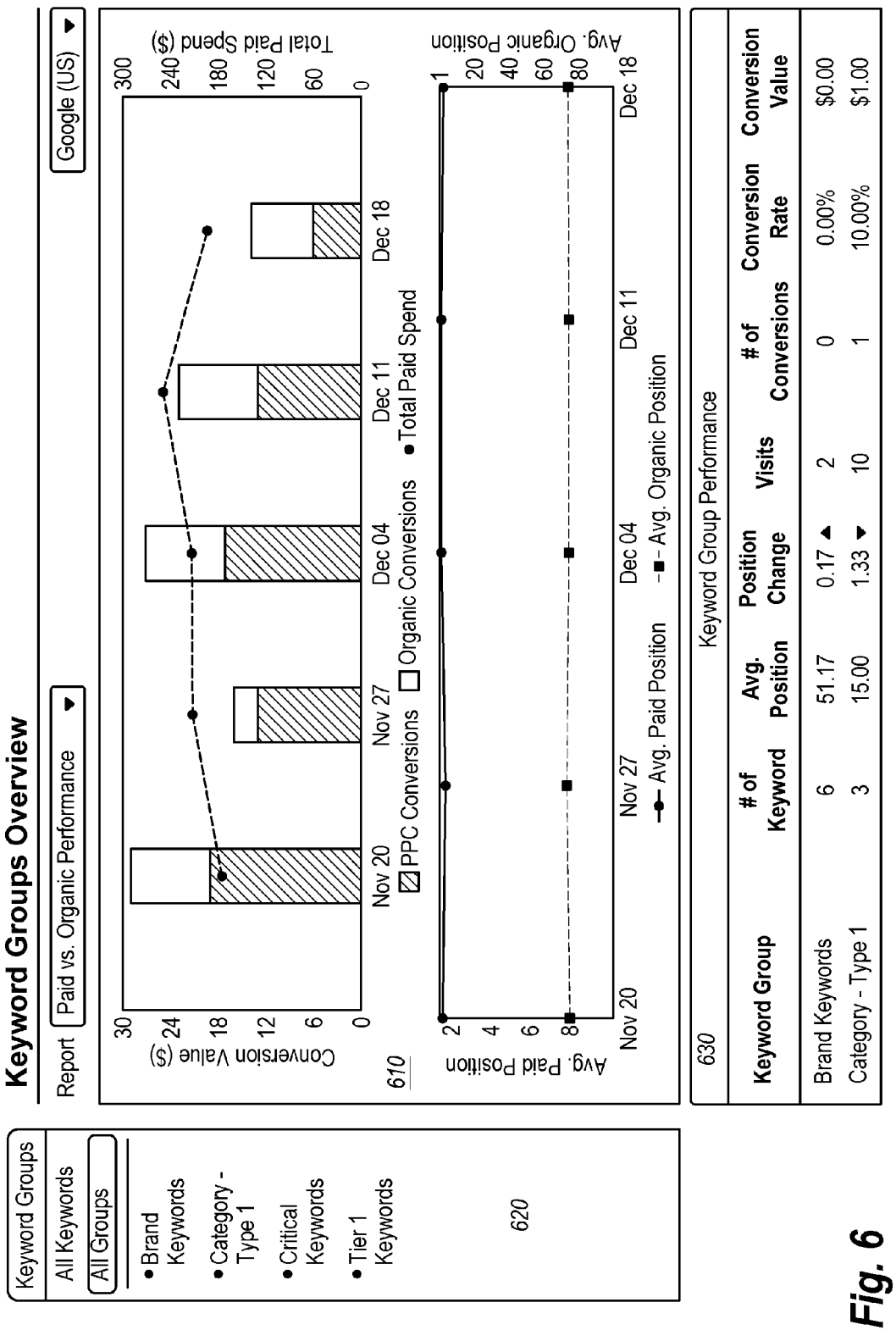
FIG. 6 illustrates an example of a screenshot of a graphical interface in accordance with some embodiments.

FIG. 6 illustrates an example of a screen shot of a graphical interface. In some embodiments, the graphical interface of FIG. 6 may simultaneously display details associated with keyword groups that are associated with keywords of paid and organic search campaigns from at least two channels. The graphical interface of FIG. 6 may include graphs 610 demonstrating the performance of paid and organic search campaigns associated with particular keyword groups 620. In some embodiments, the graphs 610 may demonstrate performance tracked over time. In some embodiments, the graphs 610 may demonstrate performance in a particular search engine (e.g., Google, Yahoo, and/or Bing) and/or in a particular country. The graphs 610 may include a graph demonstrating, over time, the conversion value and total paid spending for paid and organic campaigns for all keyword groups. The graphs 610 may further include a graph demonstrating, over time, the average paid and organic search result position for paid and organic search campaigns for all keyword groups. Additionally or alternatively, the graphs 610 may show and/or compare any other information derived from the signals collected from the one or more first channels. For example, the graphs may also include, but are not limited to, impressions, conversion rates, number of conversions, revenue generated from a paid search campaign, traffic generated from a paid search campaign, best converting ad copy, page rank, click through rate, bid price, page placement of the reference, frequency of the reference on a given web page, location of the reference on the web page, etc. The information in the graphs 610 may be derived from signals, references, and/or content collected and/or identified from one or more first channels, for example, as described with relation to FIGS. 2A-5 herein.

The graphical interface of FIG. 6 may further include a table 630. In some embodiments, the table 630 may demonstrate the performance of keyword campaigns, for example, by demonstrating overall keyword campaign performance, keyword group performance, and/or individual keyword performance. In some embodiments, the table 630 may demonstrate performance in a particular search engine (e.g., Google, Yahoo, and/or Bing) and/or in a particular country. In some embodiments, the table 630 of FIG. 6 may demonstrate the conversion value of keywords by keyword group, for example, by listing the number of keywords in a group, the average search position of the keyword group, the change in average search position, the number of visits, the number of conversions, the conversion rate, and/or the conversion value. Additionally or alternatively, the table 630 may demonstrate any other information derived from the signals collected from the one or more first channels. For example, the graphs may also include, but are not limited to, impressions, conversion rates, number of conversions, revenue generated from a paid search campaign, traffic generated from a paid search campaign, best converting ad copy, page rank, click through rate, bid price, page placement of the reference, frequency of the reference on a given web page, location of the reference on the web page, etc. The information in the table 630 may be derived from signals, references, and/or content collected and/or identified from one or more first channels, for example, as described with relation to FIGS. 2A-5 herein.

The graphical interface of FIG. 6 may further include information about competitors of an entity. For example, information may be given in graphs 610 and tables 630 for competitive analysis. For example, in some embodiments, the paid, organic, and/or combined search market of a competitor may be determined. In some embodiments, estimations may be made as to unknown data of a competitor by comparing known data of the competitor to data of the entity, for example, an estimated total value of one or more keywords for a competitor.

FIG. 7 illustrates an example of a screen shot of a graphical interface. In some embodiments, the graphical interface of FIG. 7 may simultaneously displays details associated with keywords of paid and organic search campaigns from at least two first channels and may further provide recommendations with respect to a campaign within a second channel. The graphical interface may include one or more graphs and/or tables that demonstrate any information derived from the signals collected from the one or more first channels. In some embodiments, the one or more tables may demonstrate performance in a particular search engine and/or in a particular country. For example, the graphs may also include, but are not limited to, impressions, conversion rates, number of conversions, revenue generated from a paid search campaign, traffic generated from a paid search campaign, best converting ad copy, page rank, click through rate, bid price, page placement of the reference, frequency of the reference on a given web page, location of the reference on the web page, etc. The information in the graphs and/or tables may be derived from signals, references, and/or content collected and/or identified from one or more first channels, for example, as described with relation to FIGS. 2A-5 herein. For example, the graphical interface of FIG. 7 may include an overall performance table 710 and/or a keyword details table 720.

In some embodiments, the overall performance table 710 may include information demonstrating the overall value of all keyword campaigns for a given reporting period, for example, a most recent reporting period. The overall performance table 710 may include average cost per click (CPC) of paid campaigns, average paid position, total paid spending, paid conversion value, average organic position, organic conversion value, and/or total value of paid and organic campaigns. In some embodiments, the overall performance table 710 may include information demonstrating the change in values, for example, if compared to values from a previous reporting period.

In some embodiments, the keyword details table 720 may include information demonstrating the combined paid and organic value of particular keywords. In some embodiments, individual keywords belonging to a keyword group 730 may be included in the keyword details table 720. In some embodiments, the keyword details table 720 may include information associated with one or more particular keywords, for example, the particular webpage associated with a keyword, the average cost per click paid for the keyword, the average paid position of the keyword, the total paid spending of the keyword, the paid conversion value of the keyword, the average organic position of the keyword, the organic conversion value of the keyword, and/or the total paid and organic value of the keyword. In some embodiments, the keyword details table 720 may include information for a particular period of time, for example, over a weeklong period. In some embodiments, the keyword details table may include information demonstrating the change in values, for example if compared to values from a previous period of time.

The graphical interface of FIG. 7 may further include recommendations 740. The recommendations 740 may include, for example, any recommendations described herein, including, but not limited to, the recommendations described with relation to FIGS. 2A-2C. The recommendations may be derived, optimized, prioritized, etc. in any manner as described herein, including, but not limited to, as discussed with relation to FIGS. 2A-2C. In some embodiments, the recommendations 740 may include tools to allow a user to run paid social media campaigns. For example, the recommendations may include ways to allow a user to make a social media message into a paid social media message to thereby increase its exposure.

Figure 8:
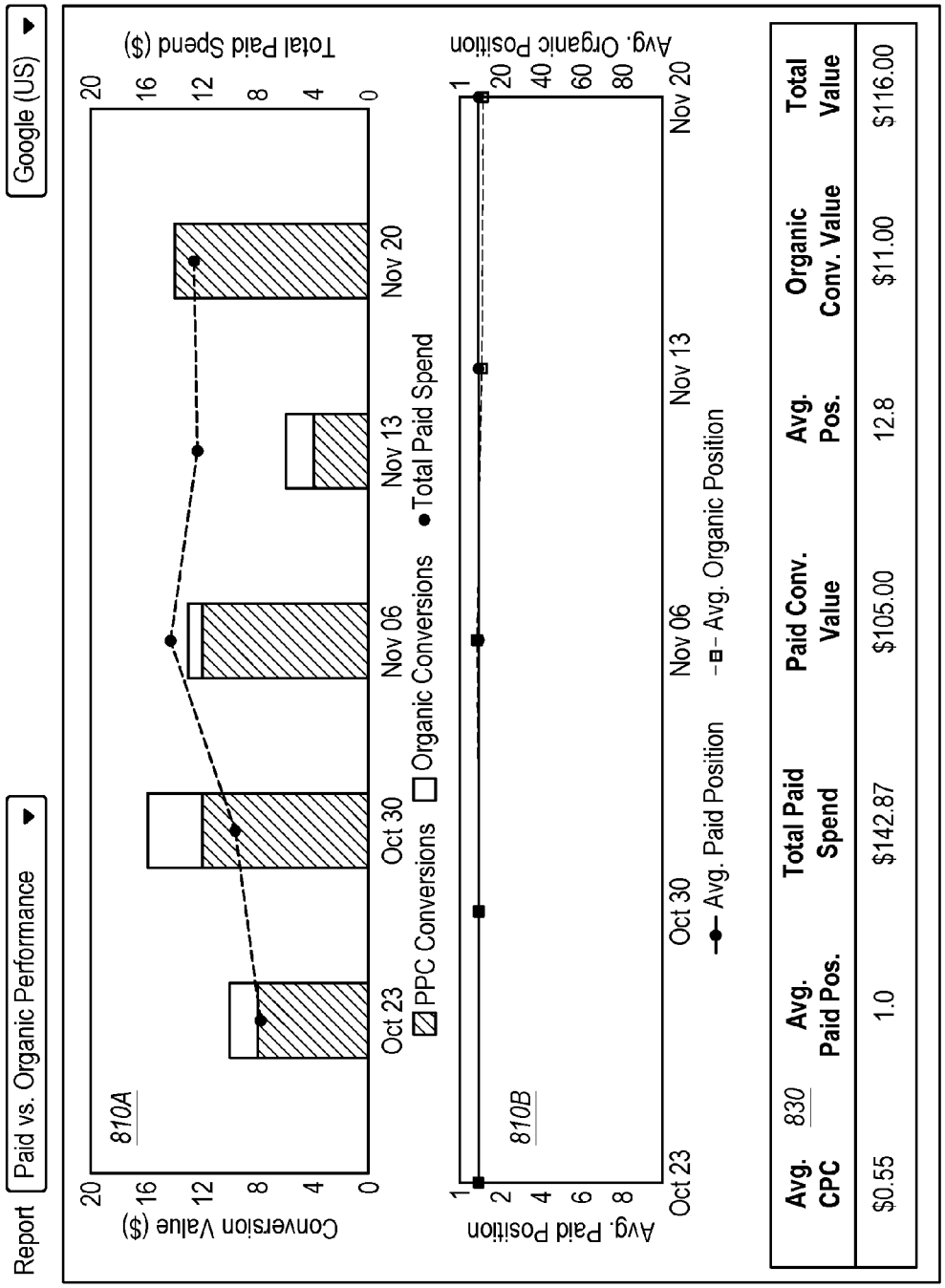
FIG. 8 illustrates another example of a screenshot of a graphical interface in accordance with some embodiments.

FIG. 8 illustrates an example of a screen shot of a graphical interface. In some embodiments, the graphical interface of FIG. 8 may simultaneously display details associated with an individual keyword of paid and organic search campaigns from at least two channels. The graphical interface of FIG. 8 may include graphs 810A and 810B and tables 830. In some embodiments, the graphs 810A and 810B and tables 830 may correspond generally to the graphs 610 and tables 630 of FIG. 6. In some embodiments, the details provided in the graphs 810A and 810B and tables 830 may be associated with a single keyword.

Figure 9:
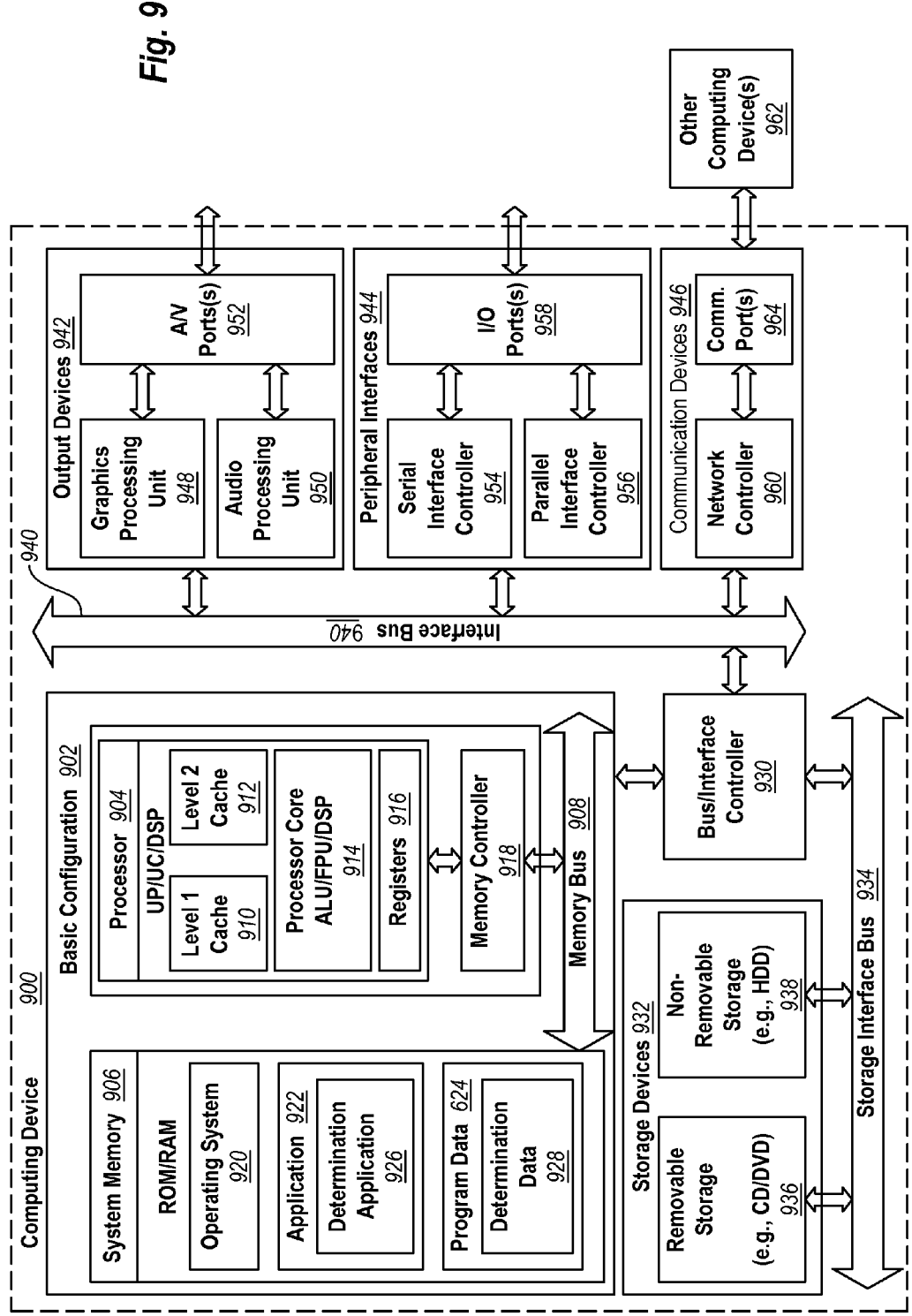
FIG. 9 illustrates an example of a computing device in accordance with some embodiments.

FIG. 9 shows an example computing device 900 that is arranged to perform any of the computing methods described herein. In a very basic configuration 902, computing device 900 generally includes one or more processors 904 and a system memory 906. A memory bus 908 may be used for communicating between processor 904 and system memory 906.

Depending on the desired configuration, processor 904 may be of any type including but not limited to a microprocessor (μP), a microcontroller (μC), a digital signal processor (DSP), or any combination thereof. Processor 904 may include one more levels of caching, such as a level one cache 910 and a level two cache 912, a processor core 914, and registers 916. An example processor core 914 may include an arithmetic logic unit (ALU), a floating-point unit (FPU), a digital signal-processing core (DSP Core), or any combination thereof. An example memory controller 918 may also be used with processor 904, or in some implementations, memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, one or more applications 922, and program data 924. Application 922 may include a determination application 926 that is arranged to perform the functions as described herein including those described with respect to methods described herein. Program Data 924 may include determination data 928 that may be useful for analyzing SEO data to identify category specific search results. In some embodiments, application 922 may be arranged to operate with program data 924 on operating system 920.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display device or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations. The computing device 900 can also be any type of network computing device. The computing device 900 can also be an automated system as described herein.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    collecting signals from one or more first channels, including organic search, in a communication network using a computing system, the signals collected from the one or more first channels include page rank in organic search results associated with one or more keywords of an organic search campaign;
    determining, using the computing system, a relationship between the organic search campaign associated with the one or more first channels and a paid search campaign associated with a second channel that includes paid search, the relationship between the organic search campaign and the paid search campaign including a paid search conversion rate of the one or more keywords within the paid search campaign being additive to or detracting from an organic search conversion rate of the one or more keywords within the organic search campaign in response to an increase in a bid price associated with the one or more keywords in the paid search campaign, wherein:
    the paid search conversion rate of the one or more keywords within the paid search campaign is determined to be additive to the organic search conversion rate when all of the following are true:
    a change in paid spending for the one or more keywords is greater than zero,
    a change in paid conversion for the one or more keywords is greater than or equal to zero,
    a change in organic conversion for the one or more keywords is greater than zero, and
    a change in an average organic rank for the one or more keywords is less than or equal to zero; or
    the paid search conversion rate of the one or more keywords within the paid search campaign is determined to be additive to the organic search conversion rate when all of the following are true:
    a change in paid spending for the one or more keywords is less than zero,
    a change in paid conversion for the one or more keywords is less than or equal to zero,
    a change in organic conversion for the one or more keywords is less than zero, and
    a change in an average organic rank for the one or more keywords is greater than or equal to zero; or
    the paid search conversion rate of the one or more keywords within the paid search campaign is determined to detract from the organic search conversion rate when all of the following are true:

a change in paid spending for the one or more keywords is greater than or equal to zero;

a change in paid conversion for the one or more keywords is greater than zero, a change in organic conversion for the one or more keywords is less than zero, and a change in an average organic rank for the one or more keywords is greater than or equal to zero; or the paid search conversion rate of the one or more keywords within the paid search campaign is determined to detract from the organic search conversion rate when all of the following are true:

a change in paid spending for the one or more keywords is less than or equal to zero, a change in paid conversion for the one or more keywords is less than zero, a change in organic conversion for the one or more keywords is greater than zero, and a change in an average organic rank for the one or more keywords is less than or equal to zero; and making a recommendation with respect to the paid search campaign within the second channel based on the collected signals and the relationship between the organic search campaign and the paid search campaign, wherein the recommendation includes:

recommending maintaining or increasing the bid price associated with the one or more keywords in the paid search campaign if the paid search conversion rate of the one or more keywords within the paid search campaign is additive to the organic search conversion rate of the one or more keywords within the organic search campaign, or recommending decreasing the bid price associated with the one or more keywords in the paid search campaign if the paid search conversion rate of the one or more keywords within the paid search campaign detracts from the organic search conversion rate of the one or more keywords within the organic search campaign.

2. The method of claim 1, further comprising optimizing the recommendation through application of at least one of the following to the collected signals: linear programming, statistical analysis, combinatorial analysis, or fuzzy logic.

3. The method of claim 1, further comprising collecting signals from at least one of: competitive intelligence, mobile advertisements, video advertisements, past historical data, past seasonal data, or geographical influences wherein the recommendation is further based on the signals collected therefrom.

4. The method of claim 1, further comprising controlling an automated bidding platform such that the bid price associated with the one or more keywords is automatically updated in response to the recommendation.

5. The method of claim 1, wherein the recommendation with respect to the paid search campaign within the second channel are based at least in part on a predictive model of the one or more keywords, the predictive model based at least in part on whether the paid search conversion rate is additive to or detracts from the organic search conversion rate.

6. The method of claim 1, further comprising optimizing the recommendation based on a plurality of conversion attribution models.

7. A method, comprising:

collecting signals from an organic search in a communication network using a computing system, the signals collected from the organic search including page rank associated with one or more keywords of an organic search campaign;

determining, using the computing system, whether a paid search conversion rate of the one or more keywords within a paid search campaign is additive to or detracting from an organic search conversion rate of the one or more keywords within the organic search in response to an increase in a bid price associated with the one or more keywords in the paid search campaign, wherein:

the paid search conversion rate is determined to be additive to the organic search conversion rate when all of the following are true:

a change in paid spending for the one or more keywords is greater than zero, a change in paid conversion for the one or more keywords is greater than or equal to zero, a change in organic conversion for the one or more keywords is greater than zero, and a change in an average organic rank for the one or more keywords is less than or equal to zero; or the paid search conversion rate is determined to be additive to the organic search conversion rate when all of the following are true:

a change in paid spending for the one or more keywords is less than zero, a change in paid conversion for the one or more keywords is less than or equal to zero, a change in organic conversion for the one or more keywords is less than zero, and a change in an average organic rank for the one or more keywords is greater than or equal to zero; or the paid search conversion rate is determined to detract from the organic search conversion rate when all of the following are true:

a change in paid spending for the one or more keywords is greater than or equal to zero;

a change in paid conversion for the one or more keywords is greater than zero, a change in organic conversion for the one or more keywords is less than zero, and a change in an average organic rank for the one or more keywords is greater than or equal to zero; or the paid search conversion rate is determined to detract from the organic search conversion rate when all of the following are true:

a change in paid spending for the one or more keywords is less than or equal to zero, a change in paid conversion for the one or more keywords is less than zero, a change in organic conversion for the one or more keywords is greater than zero, and a change in an average organic rank for the one or more keywords is less than or equal to zero; and recommending maintaining or increasing the bid price associated with the one or more keywords in the paid search campaign if the paid search conversion rate is additive to the organic search conversion rate of the one or more keywords within the organic search campaign.

8. The method of claim 7, further comprising optimizing the recommendation through application of at least one of the following to the collected signals: linear programming, statistical analysis, combinatorial analysis, or fuzzy logic.

9. The method of claim 7, further comprising collecting signals from at least one of: competitive intelligence, mobile advertisements, video advertisements, past historical data, past seasonal data, or geographical influences wherein the recommendation is further based on the signals collected therefrom.

10. The method of claim 7, wherein the recommendation is based at least in part on a predictive model of the one or more keywords, the predictive model based at least in part on whether the paid search conversion rate is additive to or detracts from the organic search conversion rate.

11. The method of claim 7, further comprising optimizing the recommendation based on a plurality of conversion attribution models.

12. The method of claim 7, further comprising controlling an automated bidding platform such that the bid price associated with the one or more keywords is automatically updated in response to the recommendation.

13. A method, comprising:
collecting signals from an organic search in a communication network using a computing system, the signals collected from the organic search including page rank associated with one or more keywords of an organic search campaign;
determining, using the computing system, whether a paid search conversion rate of the one or more keywords within a paid search campaign is additive to or detracting from an organic search conversion rate of the one or more keywords within the organic search in response to an increase in a bid price associated with the one or more keywords in the paid search campaign, wherein:
the paid search conversion rate is determined to be additive to the organic search conversion rate when all of the following are true:
a change in paid spending for the one or more keywords is greater than zero,
a change in paid conversion for the one or more keywords is greater than or equal to zero,
a change in organic conversion for the one or more keywords is greater than zero, and
a change in an average organic rank for the one or more keywords is less than or equal to zero; or
the paid search conversion rate is determined to be additive to the organic search conversion rate when all of the following are true:
a change in paid spending for the one or more keywords is less than zero,
a change in paid conversion for the one or more keywords is less than or equal to zero,
a change in organic conversion for the one or more keywords is less than zero, and
a change in an average organic rank for the one or more keywords is greater than or equal to zero; or
the paid search conversion rate is determined to detract from the organic search conversion rate when all of the following are true:
a change in paid spending for the one or more keywords is greater than or equal to zero;
a change in paid conversion for the one or more keywords is greater than zero,
a change in organic conversion for the one or more keywords is less than zero, and
a change in an average organic rank for the one or more keywords is greater than or equal to zero; or
the paid search conversion rate is determined to detract from the organic search conversion rate when all of the following are true:
a change in paid spending for the one or more keywords is less than or equal to zero,
a change in paid conversion for the one or more keywords is less than zero,
a change in organic conversion for the one or more keywords is greater than zero, and
a change in an average organic rank for the one or more keywords is less than or equal to zero; and
recommending decreasing the bid price associated with the one or more keywords in the paid search campaign if the paid search conversion rate detracts from the organic search conversion rate of the one or more keywords within the organic search campaign.

14. The method of claim 13, further comprising optimizing the recommendation through application of at least one of the following to the collected signals: linear programming, statistical analysis, combinatorial analysis, or fuzzy logic.

15. The method of claim 13, further comprising collecting signals from at least one of: competitive intelligence, mobile advertisements, video advertisements, past historical data, past seasonal data, or geographical influences wherein the recommendation is further based on the signals collected therefrom.

16. The method of claim 13, wherein the recommendation is based at least in part on a predictive model of the one or more keywords, the predictive model based at least in part on whether the paid search conversion rate is additive to or detracts from the organic search conversion rate.

17. The method of claim 13, further comprising optimizing the recommendation based on a plurality of conversion attribution models.

18. The method of claim 13, further comprising controlling an automated bidding platform such that the bid price associated with the one or more keywords is automatically updated in response to the recommendation.

* * * * *